(12) United States Patent
Takahashi

(10) Patent No.: US 8,011,310 B2
(45) Date of Patent: Sep. 6, 2011

(54) SHIP WITH REDUCED FRICTIONAL RESISTANCE AND ITS OPERATION METHOD

(75) Inventor: Yoshiaki Takahashi, Tokyo (JP)

(73) Assignee: K & I Inc., Tokyo (JP)

(*) Notice: Subject to any disclaimer, the term of this patent is extended or adjusted under 35 U.S.C. 154(b) by 0 days.

(21) Appl. No.: 12/922,174

(22) PCT Filed: Apr. 1, 2009

(86) PCT No.: PCT/JP2009/001531
§ 371 (c)(1),
(2), (4) Date: Sep. 12, 2010

(87) PCT Pub. No.: WO2009/128211
PCT Pub. Date: Oct. 22, 2009

(65) Prior Publication Data
US 2011/0000418 A1    Jan. 6, 2011

(30) Foreign Application Priority Data

Apr. 17, 2008 (JP) .................................. 2008-107482
Jun. 24, 2008 (JP) .................................. 2008-164871

(51) Int. Cl.
*B63B 1/34* (2006.01)
*B63B 1/38* (2006.01)
(52) U.S. Cl. ..................................................... 114/67 A
(58) Field of Classification Search ................ 114/67 A, 114/67 R, 288–290
See application file for complete search history.

(56) References Cited

U.S. PATENT DOCUMENTS

| 6,748,891 | B2* | 6/2004 | Takahashi ................... 114/67 A |
| 6,789,491 | B2 | 9/2004 | Takahashi |
| 7,654,212 | B2 | 2/2010 | Takahashi |
| 7,677,191 | B2 | 3/2010 | Takahashi |
| 2002/0014192 | A1 | 2/2002 | Takahashi |
| 2003/0097971 | A1 | 5/2003 | Takahashi |

FOREIGN PATENT DOCUMENTS

| JP | 08-244676A A1 | 9/1996 |
| JP | 11-180380A A1 | 7/1999 |
| JP | 11321775 A * | 11/1999 |
| JP | 2000-29679A A1 | 1/2000 |
| JP | 2001-055189A A1 | 2/2001 |
| JP | WO0166410 A1 | 9/2001 |
| JP | 2001-278178A A1 | 10/2001 |
| JP | 2002-002582 A | 1/2002 |
| JP | 2002-002583A A1 | 1/2002 |
| JP | 2002079986 A * | 3/2002 |
| JP | 3121607U B1 | 4/2006 |
| KR | 20010095242A B2 | 11/2001 |

* cited by examiner

*Primary Examiner* — Ajay Vasudeva
(74) *Attorney, Agent, or Firm* — Lee Fredric Sharra

(57) ABSTRACT

Micro-bubble generators attached to a ship hull below the waterline decrease frictional resistance during navigation and improve fuel efficiency. Each micro-bubble generator is supplied with air and has a wing positioned outside the hull for generating negative pressure. The negative pressure created by the wing increases with an increase in ship's speed, which pushes the air-liquid interface outwardly toward the wing. As the air and the water move at different speeds due to difference in their densities, micro-bubbles are generated in the micro-bubble generator according to the Kelvin-Helmholtz Instability mechanism and discharged downstream to move closely along the outside surface of the hull.

6 Claims, 7 Drawing Sheets

(a)

(b)

SHIP WITH REDUCED FRICTIONAL RESISTANCE AND ITS OPERATION METHOD

TECHNICAL FIELD

Figure 1:
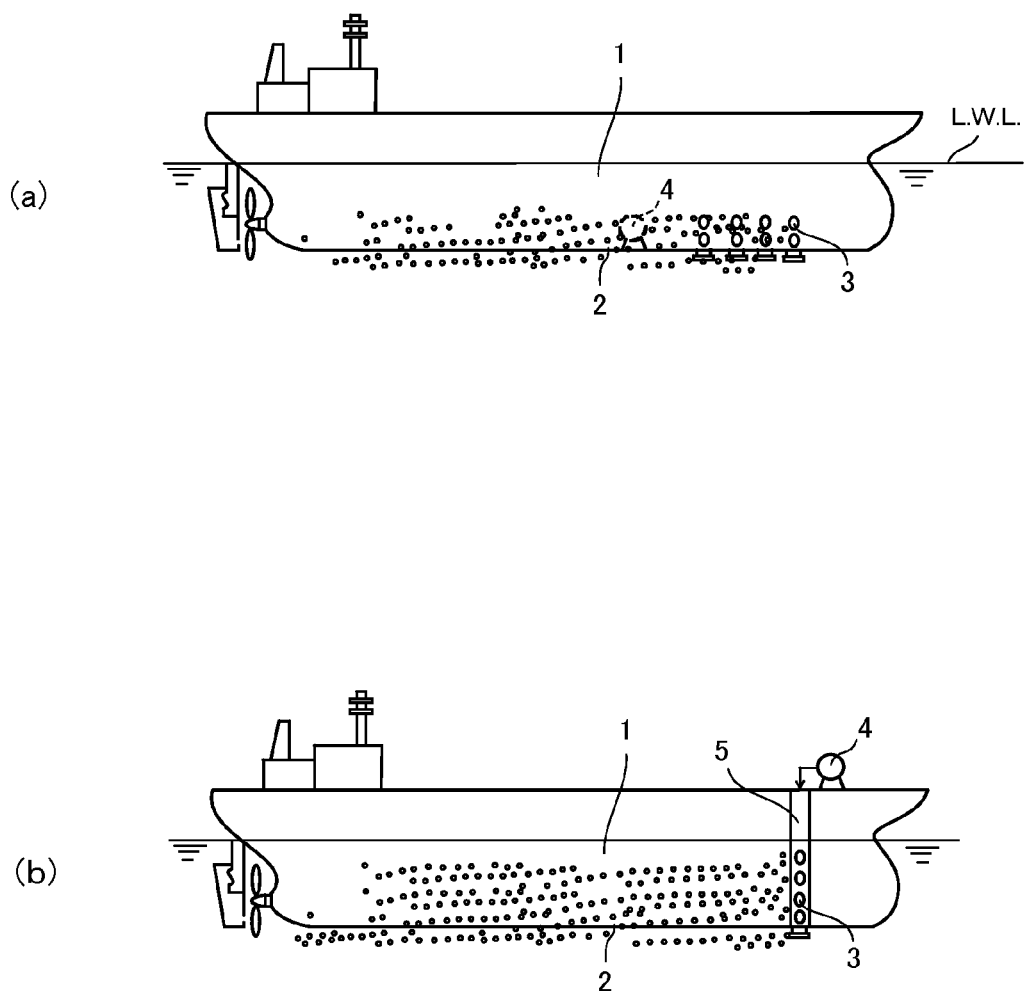

This invention relates to a ship with reduced frictional resistance which supplies micro-bubbles (fine bubbles) to the outside surface of the hull, and reduces the frictional resistance between hull and water, and its operation method.

BACKGROUND ART

It is known that a ship's hull friction resistance in water will be decreased by supplying air bubbles to the moving hull's surface.

As a means to send air to the micro bubble generator located in the ship's bottom (lateral surface), Prior Art 1 describes how air is sent into an air tank from blower. The air is retained in a compressed state, and through a pipe attached along the side outside of the hull, the air that is accumulated is supplied to the bubble forming region.

Prior Art 2 describes how air is supplied in the bubble genesis region through a pipe attached along the side outside the hull from a gas feed means provided on the deck.

It is required that micro air bubble diameter should be small as possible. For this purpose, Prior Art 3 describes how such micro-bubbles can be generated according to the Kelvin-Helmholtz-Instability phenomenon.

Namely, in Prior Art 3, a recess in the shell (immersion surface) of a ship's bottom is prepared, a gas inlet tube is connected with the recess to supply air, and a wedge-shaped negative pressure formation part is attached to the upper stream side of the recess to then generate micro-bubble in a recess to effect the Kelvin-Helmholtz-Instability phenomenon.

Moreover, Prior Art 4, describes the technology of employing a wing as a means for which to make micro-bubbles instead of the wedge-shaped negative pressure formation part of Prior Art 3. Particularly, blower 35 is disclosed in FIG. 17A, 17B of Prior Art 4, and the air is supplied from the blower 35 in a fluid passage is described in column 23 and 24 of Prior Art 4.

PRIOR ART

Patented Documents
[Prior art 1] Japanese Laid Open Patent Publication (tokkai) Heisei JP11-180380
[Prior art 2] Japanese Laid Open Patent Publication (tokkai) JP2000-296796
[Prior art 3] Japanese Laid Open Patent Publication (tokkai) JP2002-2582
[Prior art 4] U.S. Pat. No. 6,789,491

DISCLOSURE OF THE INVENTION

Object of the Invention

The technology as described in Prior Art 1, discloses that air from a blower is sent to an air tank to accumulate in a compressed state, and this requires a large-scale device. Also, neither Prior Art 1 nor 2 provides for the bubble generating area to become a structure suitable for the generation of micro-bubbles.

The technology described in Prior Art 3 or 4 can create micro air bubbles (microbubbles) that are desirable for reduction of friction resistance. However, in Prior Art 3 and 4, as air is drawn by negative pressure formed by a negative pressure formation moiety (portion, part, element), when negative pressure does not become sufficiently larger than a predetermined value, air bubbles will not be created. Particularly in Prior Art 4, air is sent into by blower through a fluid passage, but because that fluid passage is an open type, air escapes from the upper part, and the air-liquid interface cannot be pushed down.

Means of Solving the Problems

In order to solve the above-mentioned problems in a reduced frictional resistance ship, said ship is equipped with micro-bubble generators located in an opening formed in the hull. The micro-bubble generator is comprised of a plate that fits in the opening and has a wing for negative pressure attached to the plate. A window is formed at a point opposite the wing of the plate. This window communicates with the inside of the opening at the outside of the hull. A pipe that supplies the opening with air is connected to the side of the ship in the opening. An air pressure source, such as a compressor, is connected to the pipe to depresses the air-liquid interface in the air charging pipe to the micro-bubble generation region. An air supply system to supply air from the air pressure source to the micro-bubble generators comprises a pipe, a header and a valve, and the air supply system is closed except an end facing the opening. The distance between the rear edge of the wing and the plate is bigger than the distance between the front edge of the wing and the plate.

The window has a certain capacity, and this window functions as micro-bubble generation space by utilizing the Kelvin-Helmholtz-Instability phenomenon. It is preferable to provide a chamber in the upper reaching part of the window for the stabilization of air supplied to this window.

The operating method of the frictional resistance reduction ship according to the invention is premised that frictional resistance reduction is maintained through the ship's navigation motion. An air pressure source such as a compressor and the negative pressure that is generated by the wing with the navigation of the ship depresses (pushes down) the air-liquid interface in the pipe to a micro-bubble genesis region. Air is supplied along the hull surface as micro-bubbles by being drawn from the pipe, these micro-bubbles adhere to the hull. Navigation maintains this state. Here, micro-bubble refers to an air bubble having a diameter less than several millimeters preferably having a particle size of 1 mm or less.

Effect of the Invention

According to the present invention concerning a frictional resistance reduction ship, coating the bottom surface and the side surfaces of the hull with micro air bubbles (microbubbles) greatly reduces the frictional resistance and contributes to a great reduction in fuel usage.

According to the present invention, negative pressure is generated with navigation, and the negative pressure is assisted by an air pressure source, such as a compressor, whereby the air which is necessary for generation of the micro-bubble is capable of being supplied to the micro-bubble genesis region when navigation speed is slow.

Here, when a ship begins its forward motion, the air-liquid interface in the pipe will be depressed accordingly. So long as there is enough pressure to force air down the column of water from the interface to the upper part of the micro-bubble genesis region, it is sufficient. Thus, a large capacity compressor is not necessary, for example, when the output of the main engine is 10,000 kw, a 10-20 kw capacity compressor is sufficient.

SIMPLE EXPLANATION OF THE DRAWINGS

Figure 2:
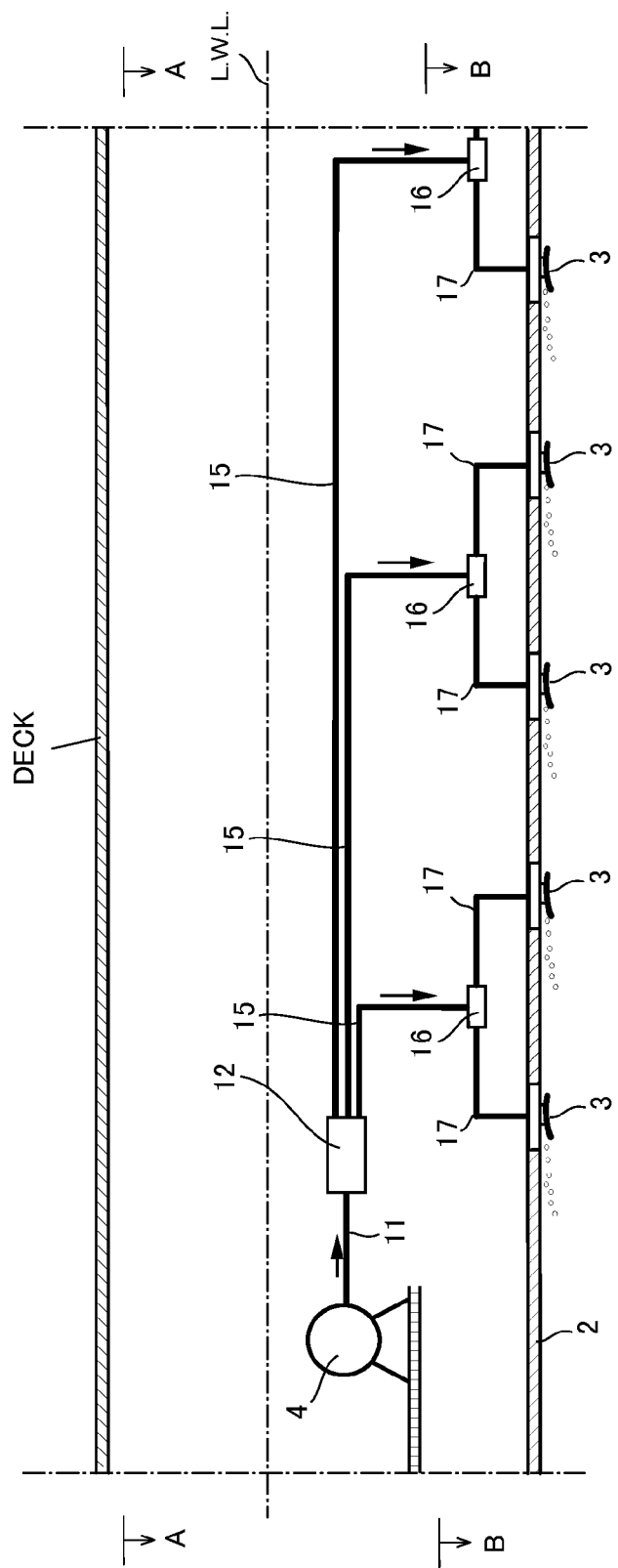
Figure 3:
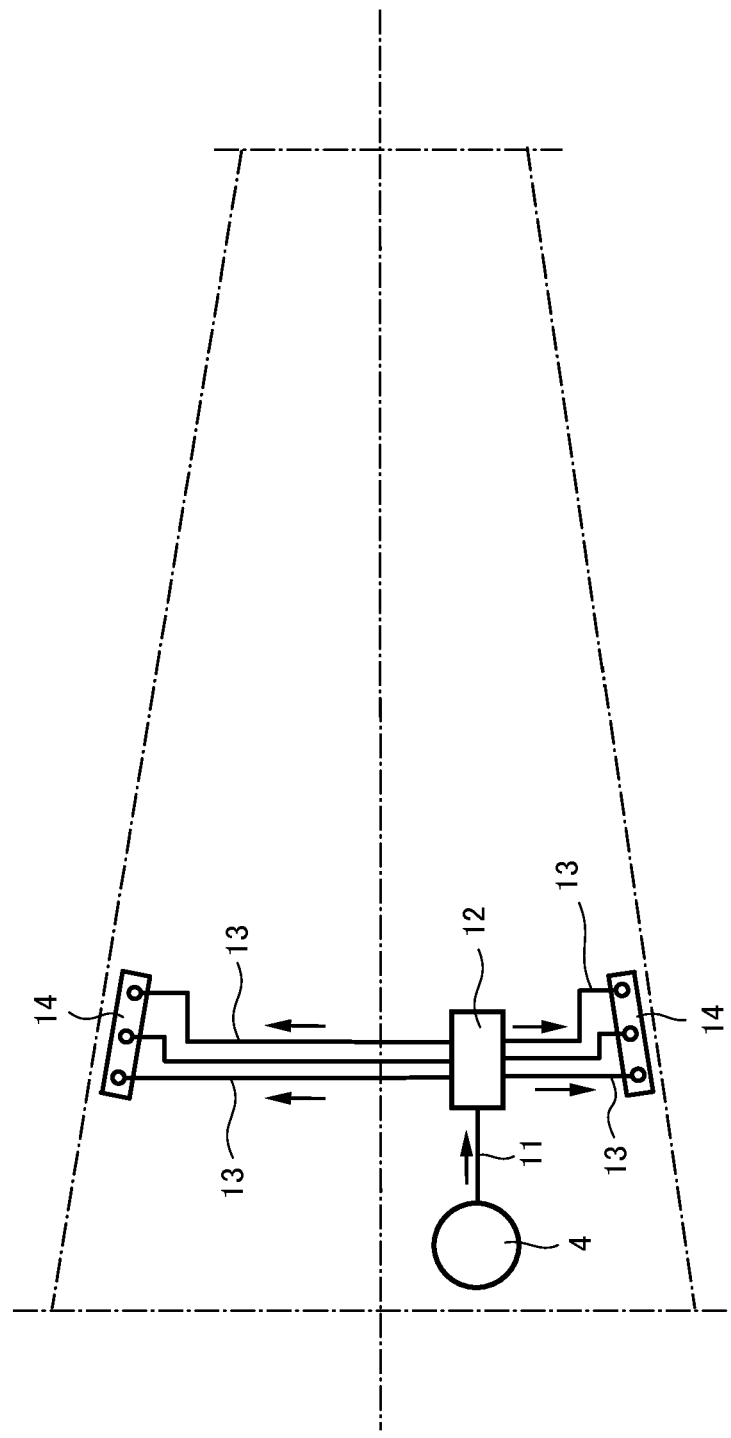
Figure 4:
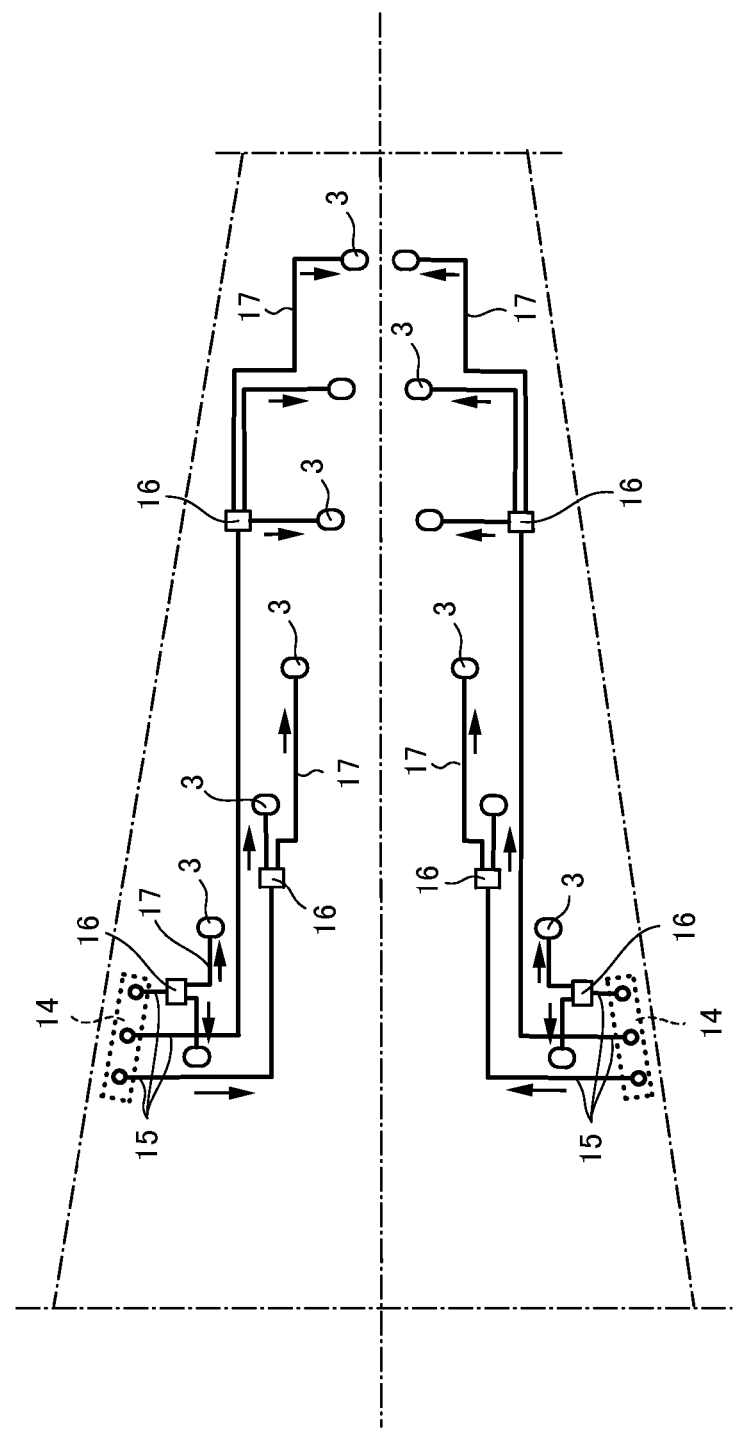
Figure 5:
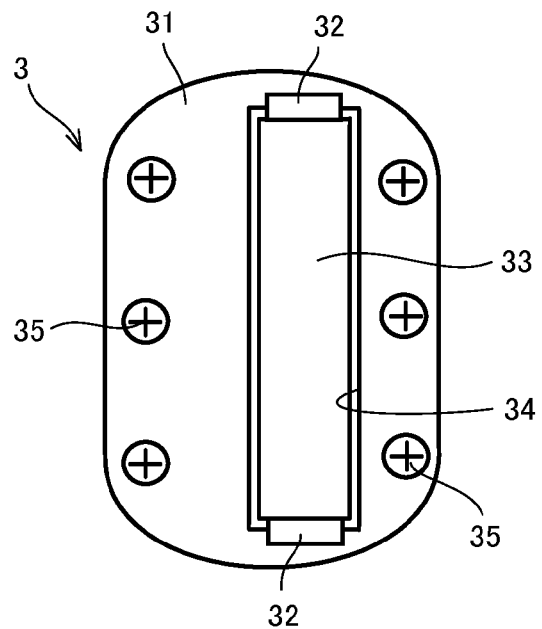
Figure 6:
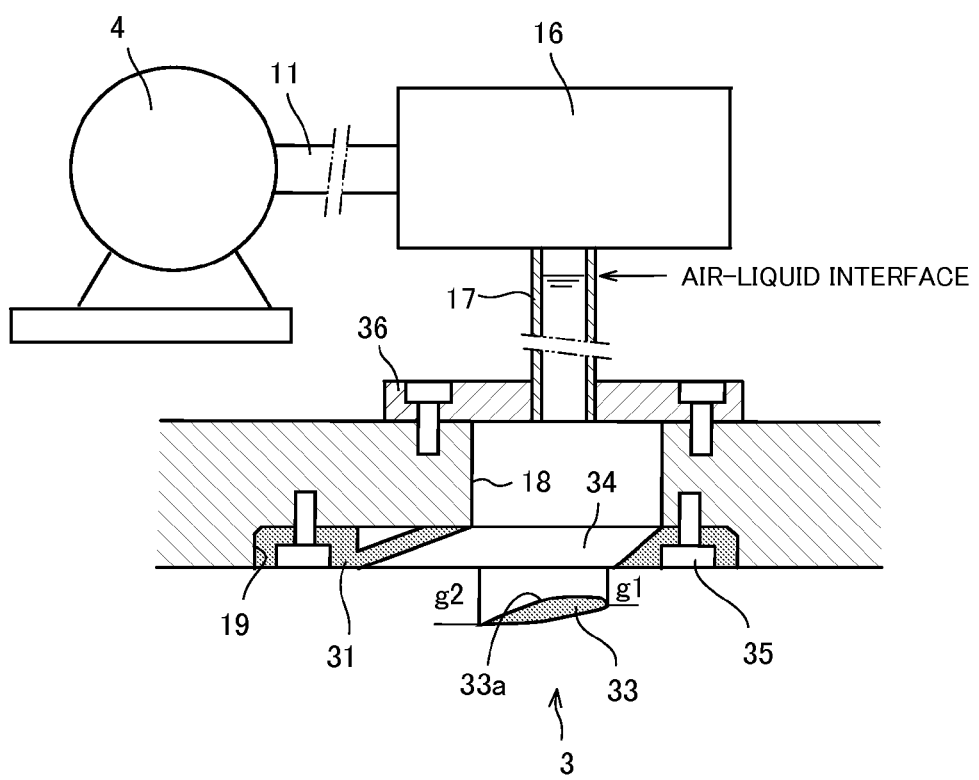
Figure 7:
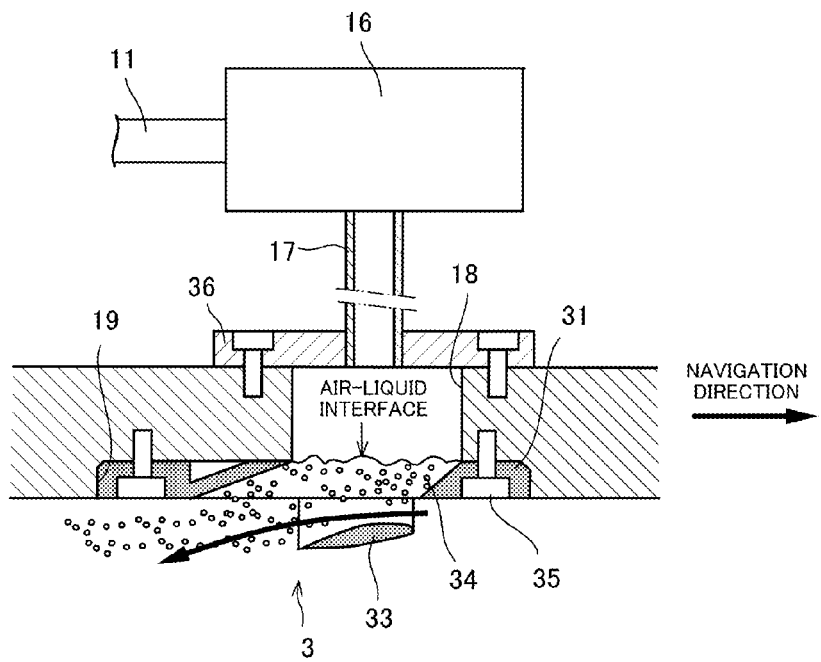
Figure 8:
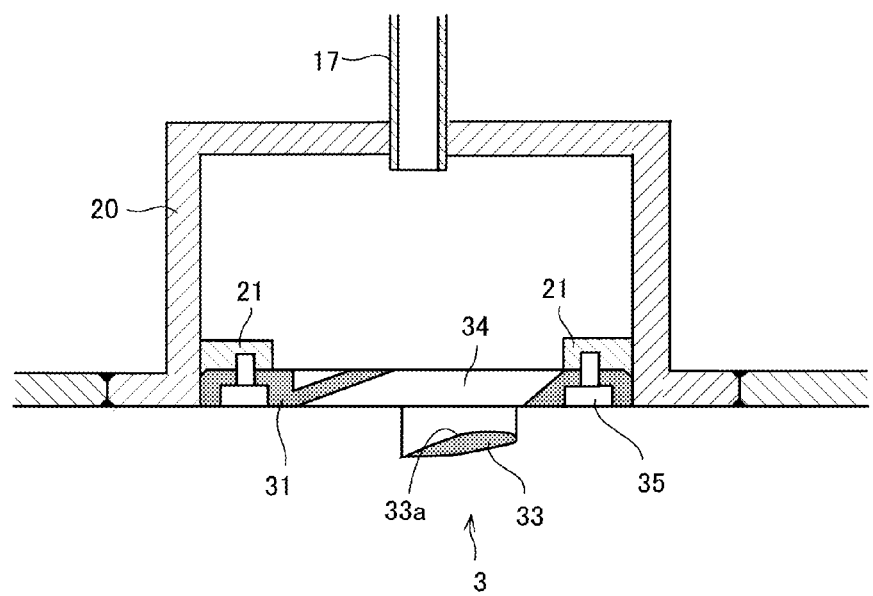
Figure 9:
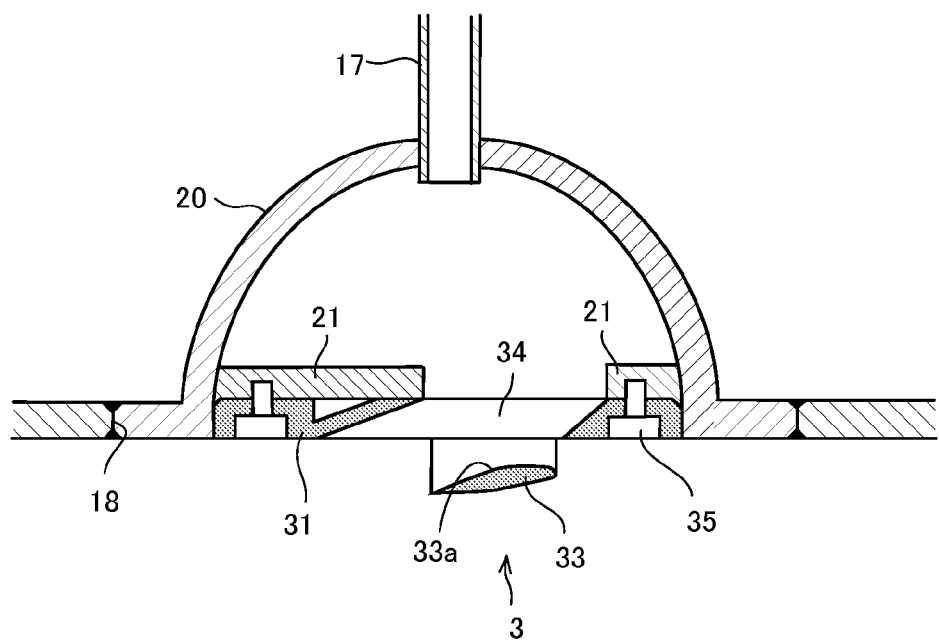

FIG. 1(a) and (b) are side views of the frictional resistance reduction ship of the present invention
FIG. 2 is a longitudinal sectional view of the thruster room
FIG. 3 is an illustration of A-A direction of FIG. 2
FIG. 4 is an illustration of B-B direction of FIG. 2
FIG. 5 is a general view of the micro-bubble generator
FIG. 6 shows the state before the air bubble outbreak with the sectional view of the conditions where micro-bubble generator is attached to the hull
FIG. 7 shows the air bubble outbreak state with the sectional view of the conditions where micro-bubble generator is attached to the hull
FIG. 8 shows another embodiment as same to the FIG. 6
FIG. 9 shows another embodiment as same to the FIG. 6

PREFERRED EMBODIMENTS OF THE INVENTION

Embodiment of the invention is explained to the attached drawings. FIG. 1(a) and (b) are side views of the frictional resistance reduction ship of the present invention, FIG. 2 is a longitudinal sectional view of the thruster room, FIG. 3 is an illustration of A-A direction of FIG. 2, FIG. 4 is an illustration of B-B direction of FIG. 2.

FIG. 5 is a general view of the micro-bubble generator, FIG. 6 shows the state before the air bubble outbreak with the sectional view of the conditions where micro-bubble generator is attached to the hull, and FIG. 7 shows the air bubble outbreak state with the sectional view of the conditions where micro-bubble generator is attached to the hull.

The frictional resistance reduction ship of the present invention is equipped with micro-bubble generators 3, said micro-bubble generators 3 are attached to the lateral surface of ship hull 1, from water line to ship bottom (keel) 2. The supply of air delivered to the micro-bubble generator 3, is provided from an assist compressor 4 located in the thruster room of the hull in the embodiment shown in FIG. 1(a), and in the embodiment shown in FIG. 1(b) it is conducted through duct 5 from assist compressor 4 located on the deck.

The details of the supply of air from assist compressor 4 located in the thruster room to micro-bubble generator 3 are shown in FIGS. 2-4. For example, air is sent into main header 12 through pipe 11 from assist compressor 4, pipe 13 is connected to main header 12, three to the left (port) side and three to the right (starboard) side as in the figure and each pipe 13 is connected to the valve 14 on the left (port) and right (starboard) sides, although actual number required depends on ship classification.

A pipe 15 leading to pipe 13 derives from valve 14. Sub-header 16 is created from the middle of pipe 15. Pipe 17 further diverges from this sub-header 16, this diverged pipe leads to the micro-bubble generator 3.

In the plane view illustration example, based on the line of the ship, a plurality of micro-bubble generators 3 are located in an offset or zigzag position. However, the plurality of micro-bubble generators 3 may be placed in series based on the line of the ship. Also, the number of pipes 17 diverging from the sub-header 16 is arbitrary, there can be either two or three of them.

The micro-bubble generator 3 consists of an ellipse or oval shaped plate 31 and side view porpoise-shaped (dolphin-shaped) wing 33 and the wing 33 is attached to the above plate 31 through joint 32. A window is formed at the position opposite the wing 33 of plate 31, and this window 34 is approximately equal to the external shape of the above wing 33, it is rectangular. The surface 33a opposite window 34 of wing 33 has a convex shape that swells towards the window 34.

Also, wing 33 is attached outside the hull to become parallel to the side (a base), the distance g2 between the rear edge of wing 33 and plate 31 is bigger than the distance g1 between the front edge of wing 33 and plate 31. When the ship navigates (under forward motion), by assuming such a position, negative pressure will be created between the wing 31 and the window 34.

Meanwhile, opening 18 is formed on the hull and this opening penetrates through the hull. A shallow reentrant 19 is formed on the outboard side of this opening 18 as part of opening 18. Plate 31 of the micro-bubble generator 3 is attached by bolt 35 in this reentrant 19.

Also, keep plate 36 is attached to the inner ship end of opening 18, the tip of pipe 17 is held within this keep plate 36. As described above, the end of pipe 17 is connected to sub-header 16 and this sub-header 16 is connected to assist pipe compressor 4 through pipe 15, pipe 13, main header 12 and pipe 11.

That is, except at the end facing opening 18 of pipe 17 that is, the air supply system is a closed system which is comprised of assist compressor 4, pipe 11, main header 12, pipe 13, valve 14, pipe 15, sub-header 16 and pipe 17. As a result, when assist compressor 4 is not engaged, the air-liquid interface try to begin to rise toward the waterline, because it is a closed system, air in pipe 17 is compressed and the air-liquid interface within pipe 17 is pushed down. This explains the state shown in FIG. 6

In the above, the water in opening 18 (air-liquid interface) is pulled down by the negative pressure which is formed with wing 33 when the ship starts navigation (forward motion) and the air-liquid interface is pushed down by the assist compressor 3 to further move the air-liquid interface around window 34.

Then, as the navigation speed (forward motion) increases, and the negative pressure which is formed by wing 33 grows larger, and as a result, the air-liquid interface is pushed down further. In respect of the air and water (sea water) moving at different speeds, since the density differs between air and water (as shown in FIG. 7), micro-bubbles are generated according to the Kelvin-Helmholtz-Instability mechanism in the micro-bubble generators and these micro-bubbles flow through them onto the downstream side along the hull.

In the above embodiment the steel plating of the hull is thick and the opening 18 can be formed within the thickness of the steel plating, additionally opening 18 is responsible for providing a stable supply of air to the window 34. However, it is desirable in those instances where the thickness of the steel hull plate and the thickness of the case 31 are approximately equal to provide a chamber as shown separately in FIG. 8 or FIG. 9.

As for the embodiment shown in FIG. 8, in hemi-cylindrical shaped chamber 20, the top surface is closed and the lower part open and welded to opening 18 formed on the hull. Pipe 17 is connected to the top, closed surface of hemi-cylindrical shaped chamber 20. Also, case 31 of the micro-bubble generator 3 is affixed with a bolt to bracket 21 provided the lower part around hemi-cylindrical-shaped chamber 20. In this way the air is stable and supplied to the window 34 of the micro-bubble generator 3 by chamber 20.

As for the embodiment shown in FIG. 9, the function is the same as FIG. 8, but a shape of chamber 20 can be described as dome shaped. Other shapes such as trough or tube shape are contemplated.

EXPLANATION OF SYMBOLS

1 . . . ship hull
2 . . . ship's bottom
3 . . . generator
4 . . . assist compressor
5 . . . duct
11 . . . pipe
12 . . . main header
13 . . . pipe
14 . . . valve
15 . . . pipe
16 . . . subheader
17 . . . air charging pipe
18 . . . opening
19 . . . reentrant
20 . . . chamber
21 . . . bracket
31 . . . plate
32 . . . joint
33 . . . wing
34 . . . window
35 . . . bolt
36 . . . keep plate
g1 . . . shortest distance between front edge of wing 33 and plate 31
g2 . . . shortest distance between rear edge of wing 33 and plate 31

The invention claimed is:

1. A ship having reduced frictional resistance, said ship comprising:
   micro-bubble generators formed in openings on a hull, each micro-bubble generator comprising a plate affixed to one of the openings and a wing attached to the plate, said wing disposed outside the hull and configured for generating negative pressure on a side facing the hull;
   a window formed in each plate at a point directly opposite the wing of the plate, said window being in fluid communication with an inside of the opening and the outside of the hull;
   an air charging pipe to supply each opening with air, said air charging pipe connected to a side of the opening;
   an air pressure source connected to each said air charging pipe, said air pressure source configured to depress air-liquid interface in said air charging pipe outwardly toward a micro-bubble generation region;
   an air supply system to supply air from the air pressure source to the micro-bubble generators, said air supply system comprising a pipe, a header and a valve, said air supply system being closed except at an end facing the opening;
   wherein a first shortest distance between a rear edge of the wing and the plate is substantially greater than a second shortest distance between a front edge of the wing and the plate; and
   wherein said micro-bubble generators are configured to discharge micro-bubbles that move downstream closely along an outside surface of said hull when water flows between the hull and the wing during ship motion.

2. The ship having reduced frictional resistance according to claim 1, wherein said air pressure source is air compressor.

3. The ship having reduced frictional resistance according to claim 1, wherein said window is substantially equal to an upper profile of the wing.

4. A method of operating the frictional resistance reduction ship of claim 1, comprising:
   discharging micro-bubbles along the outside surface of said hull to reduce frictional resistance when the ship is cruising;
   wherein the air-liquid interface in the air charging pipe is depressed by the air pressure source toward a micro-bubble generation region, and negative pressure is generated by the wing with the navigation of the ship;
   wherein when the supplied air is drained from the air charging pipe and discharged along the outside surface of the hull as micro-bubbles, the micro-bubbles adhere to the outside surface of the hull and move downstream closely along the outside surface of said hull, the micro-bubbles being maintained in such a state through the ship's navigation.

5. The method of operating the frictional resistance reduction ship according to claim 4, wherein said air pressure source is air compressor.

6. The method of operating the frictional resistance reduction ship according to claim 4, wherein said window is substantially equal to an upper profile of the wing.

* * * * *